(12) United States Patent
Numakoshi

(10) Patent No.: US 6,882,374 B2
(45) Date of Patent: Apr. 19, 2005

(54) IMAGE PROJECTION SYSTEM

(75) Inventor: Kensuke Numakoshi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 522 days.

(21) Appl. No.: 10/140,564

(22) Filed: May 7, 2002

(65) Prior Publication Data
US 2002/0167647 A1 Nov. 14, 2002

(30) Foreign Application Priority Data

May 8, 2001 (JP) ................................ P2001-137289

(51) Int. Cl.[7] ................................................ H04N 5/74
(52) U.S. Cl. ...................... 348/769; 348/742; 348/771; 359/312
(58) Field of Search ................................ 348/769, 742, 348/743, 754, 771; 359/285, 265, 287, 305, 311, 312; 385/7; 372/13; H04N 5/74

(56) References Cited

U.S. PATENT DOCUMENTS

| | | | | |
|---|---|---|---|---|
| 4,084,182 A | * | 4/1978 | Maiman | ...................... 348/760 |
| 4,244,005 A | * | 1/1981 | Jurgensen | .................... 348/769 |
| 4,611,245 A | * | 9/1986 | Trias | ........................... 348/766 |
| 4,851,918 A | * | 7/1989 | Crowley | ..................... 348/754 |
| 5,105,304 A | * | 4/1992 | Tanaka et al. | .............. 359/287 |
| 5,410,371 A | | 4/1995 | Lambert | |
| 5,687,020 A | | 11/1997 | Park | |
| 6,483,556 B1 | * | 11/2002 | Karakawa et al. | .......... 348/750 |

* cited by examiner

Primary Examiner—Michael H. Lee
(74) Attorney, Agent, or Firm—Pillsbury Winthrop LLP

(57) ABSTRACT

A DMD (4) as a image display device time divisionally displays channel images formed by separating an image into RGB channels. A white light emitted from a xenon lamp (1) is separated, by an acousto-optical element (3), into spectal components. Those spectal components are projected onto the DMD (4). A refractive index of the acousto-optical element (3) varies with a frequency of an ultrasonic wave applied thereto. Therefore, a color of the spectral component applied to the DMD (4) may be changed by varying the refractive index of the acousto-optical element. RGB monochromatic lights may be irradiated on the DMD (4) by setting the frequencies $F_R$, $F_G$, $F_B$ of the ultrasonic wave at appropriate values.

7 Claims, 2 Drawing Sheets

IMAGE PROJECTION SYSTEM

BACKGROUND OF THE INVENTION

The present invention relates to an image projection system for projecting an image, such as a video image, on a screen or the like.

In the case of a single plate image projector having a single image display device, images of each color channel of RGB are time-divisionally displayed on the image display device. The color lights of RGB are irradiated on the image display device in synchronism with the display timings, and projected as a color image onto a screen. A three primary colors filter (dichroic filter) for producing three primary colors of RGB has been used in the conventional single plate projector. The three primary colors filter is constructed such that a disc is circumferentially divided into three segmental areas, and those segmental areas are colored with RGB colors (in some type of the filter, a transparent segmental area is secured). The filter is rotated in front of the white rays of light to sequentially generate RGB colored rays of light.

In the RGB light generating system using the three primary colors filter, the transmission spectrum characteristics of the three primary colors filter are not ideal. Therefore, it is impossible to extract pure color lights of RGB, and it is very difficult to make the correct color reproduction. Further, it is difficult to synchronize the mechanical rotation of the filter with the electrically displaying of the image. In this circumstance, an irregular rotation of the filter and an out-of-sync phenomenon occur, possibly causing the lowering of a color resolution and the color shift.

Attempt to rotate the filter in an in-sync state will cause a color flicker since the limit of the rotational speed is low, and the RGB colors are not mixed and hence separately seen.

A motor drive mechanism for rotating the filter has problems with its durability, and in addition, causes noise and heat generation.

SUMMARY OF THE INVENTION

Accordingly, an object of the present invention is to provide a single plate image projection system which does not use a drive mechanism, such as the three primary colors filter of the rotary type.

To achieve the above object, there is provided an mage projection system having an image display device for displaying an image to be projected, a lamp as a light source for projection, an acousto-optical element for separating and refracting light emitted from the lamp by a diffraction grating formed by using an ultrasonic wave, and an ultrasonic wave generating device for supplying an ultrasonic wave to the acousto-optical element. In the image projection system, the image to be projected is separated into a plurality of color channels. The image display device sequentially displays the color channel images in a time divisional fashion. The ultrasonic wave generating device selectively generates, for each color, an ultrasonic wave having such a frequency as to cause the acousto-optical element to generate a refraction angle at which each of the spectral rays of color light corresponding to the color channels to be irradiated on the image display device. The displaying of each color channel on the image display device is performed in synchronism with the selecting of the frequency of the ultrasonic wave generated by the ultrasonic wave generating device In a preferred embodiment of the invention, the cycles of sequentially and time-divisionally displaying the color channel images within a one-frame period as a time width within which the image to be projected is displayed, are repeated plural times.

In another embodiment, intensity of light irradiated on the image display device is controlled in accordance with intensity of the ultrasonic wave generated by the ultrasonic wave generating device.

When an ultrasonic wave is applied to the acousto-optical element, a pattern representative of a refractive-index variation, like a diffraction grating, is formed in the acousto-optical element. The grating distance changes depending on a frequency of the ultrasonic wave applied, so that a diffraction angle changes. From the general nature of the diffraction, the refractive index (diffraction angle) becomes larger, the shorter the wavelength of light is. By utilizing this feature, an ultrasonic wave is passed through the acousto-optical element, to separate a white light into spectral components. Such a refraction angle as to allow a color light (R, G or B) of those spectral components of color lights, which corresponds to the color channel to be irradiated onto the image display device is set up by use of the ultrasonic wave. The frequency of the ultrasonic wave may be electrically selected by use of an oscillator circuit. Therefore, there is no need of using the mechanical drive unit, and the frequency selection is performed at high speed, and its synchronization with the image displaying operation is easy.

Accordingly, plural cycles of the RGB changing over are performed within a one frame (1/30 second for the NTSC). Three primary colors maybe mixed for a short time, and a color flicker is prevented. In the acousto-optical element, intensity of the diffraction grating formed varies with intensity of the ultrasonic wave applied. Accordingly, intensity of the diffracted light may be adjusted. By utilizing this, a brightness of an image projected may be adjusted. Further, the color balance may also be adjusted by separately controlling its intensity for each color channel.

DETAILED DESCRIPTION OF THE PREFERRED EMBODIMENTS

Figure 1:
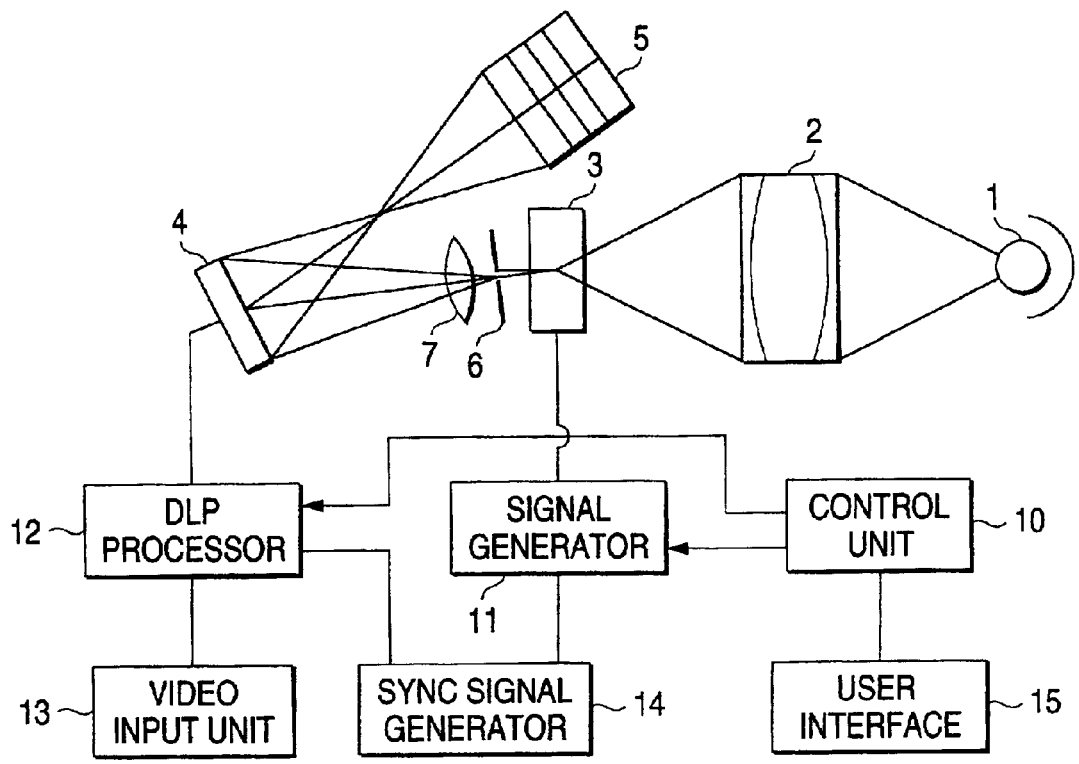
FIG. 1 is a block diagram showing an optical system of an image projection system, which is an embodiment of the present invention.
Figure 2:
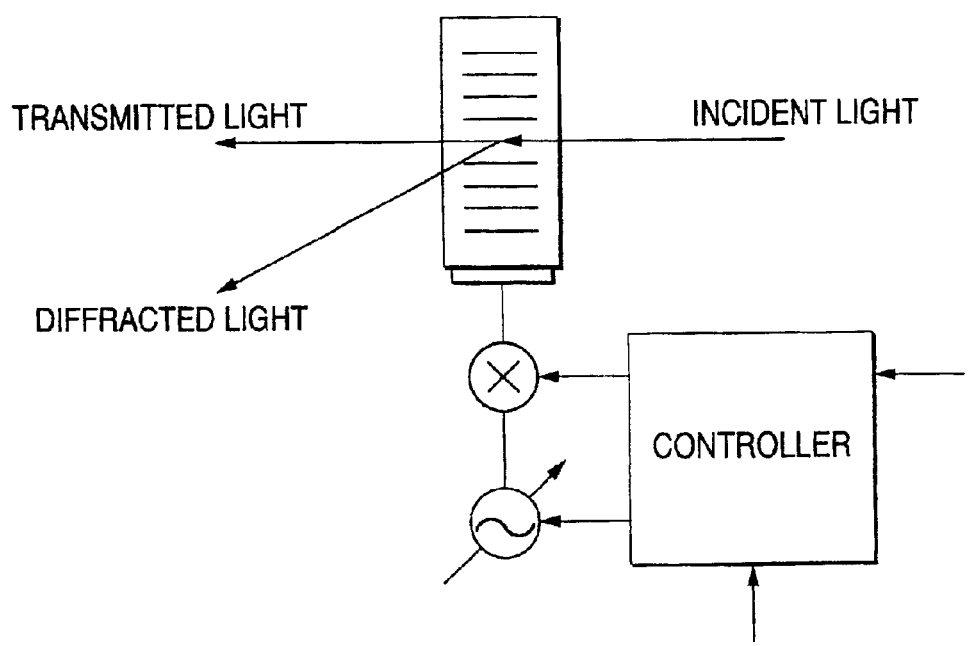
FIG. 2 is a structural diagram showing an acousto-optical element used in the image projection system.

FIG. 1 is a conceptual diagram showing an optical system of an image projection system according to an embodiment of the present invention. FIG. 2 is a structural diagram showing an acousto-optical element used in the image projection system. The image projection system uses a DMD (digital micromirror device, trade mark) 4 for an image display device for visually reproducing a video image. Further, it uses, for the color separation element, an acousto-optical element 3 which separates a white light into three primary color lights of RGB, and sequentially and time-divisionally supplies those RGB color lights to the DMD 4.

In FIG. 1, a lamp 1 for a light source is capable of emitting white light, and is a xenon lamp, for example. Light emitted from the lamp 1 is condensed by a condensing lens 2, and guided to the acousto-optical element 3. The acousto-optical element 3 separates a white light into RGB monochrmatic lights, and irradiates an image display device 4 with those monochromatic lights.

The acousto-optical element 3 refracts (diffracts) the incident light by applying an ultrasonic wave to an optical medium. The acousto-optical element is capable of adjusting a refraction angle (diffraction angle) of the optical medium by varying a frequency of the ultrasonic wave applied, and carrying out a spectra resolution of light by the utilization of a variation of the refractive index dependent on the wavelength.

The acousto-optical element is constructed as shown in FIG. 2: a piezoelectric element (transducer) is bonded to one end of a rectangular parallel epiped optical medium. The optical medium is made of a material having good acousto-optic effect, such as tellurite glass or lead molybdate single crystal. The transducer and the optical medium are bonded by using an adhesive of good frequency characteristic.

The principle of the acousto-optical element will be descried. When an ultrasonic wave propagates through an optical medium, the following phenomenon generally occurs. Since the ultrasonic wave is a longitudinal wave (compressional wave), a compression change occurs in the optical medium, as the result of the ultrasonic wave propagation therethrough, and the refractive index of the optical medium are changed at the respective portions in accordance with the compression change therein. Since the ultrasonic wave is a periodic wave, the compression variation functions as if it is a diffraction grating. When the ray of light is incident on the optical medium, the optical medium generates diffracted light which depends on the frequency and intensity of the ultrasonic wave. A diffraction angle of the diffracted light is correlated with the ultrasonic wave frequency, and intensity of the diffracted light is strongly correlated with intensity of the ultrasonic wave. From the general nature of the diffraction, the diffraction angle becomes larger, the shorter the wavelength of light is. By utilizing the principle, an ultrasonic wave is applied to the transducer to thereby form a compression-change diffraction grating in the optical medium. The diffraction grating diffracts white light and separates it into spectral components. By setting the frequency of the ultrasonic wave at an appropriate value, a predetermined spectral component of the RGB spectral components is irradiated onto the DMD 4. In the embodiment, a frequency of the ultrasonic wave to irradiate a red (R) light spectrum on the DMD 4 is $F_R$; a frequency of the ultrasonic wave to irradiate a green (G) light spectrum on the DMD 4 is $F_G$; and a frequency of the ultrasonic wave to irradiate a blue (B) light spectrum on the DMD 4 is $F_B$.

When light is incident on the acousto-optical element, the light branches out into diffracted light and transmitted light. The stronger intensity of the ultrasonic wave applied is, a compression change pattern (diffraction grating) is clearer in the acousto-optical element, and the diffracted light increases relative to the transmitted light. If intensity of the ultrasonic wave applied to the acousto-optical element 3 is adjusted by making use of this nature, intensity of the diffracted light can be adjusted. The present embodiment utilizes this for adjusting the brightness adjustment and the color balance of a projected image.

In FIG. 1, a slit 6 is located between the acousto-optical element 3 and the DMD 4, and functions to extract only intended monochromatic lights from those spectral components produced by the acousto-optical element 3, and cut off the unnecessary light components. An illumination lens 7 mixes the lights having passed through the slit (in an out-of-focusing state), and illuminates the DMD 4 with the mixed light, thereby eliminating the unevenness of amount of light and hue.

The DMD 4 is constructed such that mirrors are formed on the memory cells of a CMOS-RAM, and those micromirrors are turned in accordance with the contents (1/0) of the memory cells. Hundreds of thousand of micromirrors to one million and hundreds of thousand of micromirrors are arrayed in a matrix, and each micromirror has a size of approximately 16 $\mu$m×16 $\mu$m. In the case of the DMD of the XGA resolution, micromirrors (memory cells) of 1024×768 are arrayed. Each micromirror changes its orientation depending on "1" or "0" written into the corresponding memory cell. Accordingly, an angle of the micromirror is allocated to on or off of the pixel. Since the response speed of the micromirror is extremely high, an optical density of each pixel is expressed by controlling, for each pixel, a ratio of on-time to the whole time of displaying an image.

In the case of NTSC (National Television Systems Committee), a display time of one image is appropriately 1/30 second. During this time, images of three RGB color channels are displayed, so that a display time of one color channel image is 1/90 second. The number of the gradation levels of one (1) channel is 256 (8 bits including "0"). The on-time of each pixel is controlled at ratios 1/255 to 255/255 within the display time of each of the RGB channels.

A signal generator 11 is connected to the acousto-optical element 3, and sequentially generates ultrasonic waves of frequencies $F_R$, $F_G$, $F_B$ for transmission to the acousto-optical element 3. The timings of generating and applying the $F_R$, $F_G$, $F_B$ ultrasonic waves are synchronized with the timings of displaying the R-, G- and B-channel images by the image display device 4. The synchronization is made by a sync signal generated by a sync signal generator 14. The signal generator 11 adjusts the intensities of the $F_R$, $F_G$, $F_B$ ultrasonic waves in accordance with a brightness control signal and a color balance control signal as received from a control unit 10.

The control unit 10 generates the brightness control signal and the color balance control signal in response to adjustment operation information as input from a user interface 15.

A DLP (digital light processing, trade mark) processor 12 is connected to the image display device 4. The DLP processor is a DMD control unit for controlling the operation of writing to the memory cells of the image display device 4 in accordance with video data as input from a video input unit 13. The DLP processor 12 repeats plural cycles of the displaying of the RGB color channel images at a period of one frame (1/30 second) of NTSC, thereby suppressing generation of color flicker.

Figure 3:
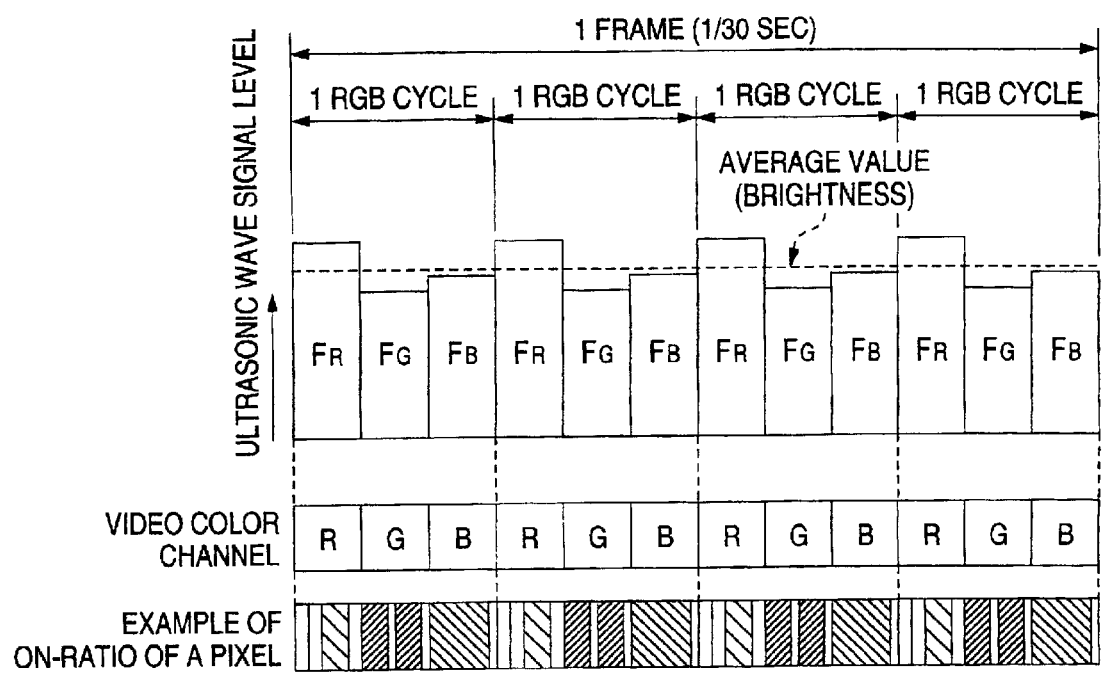
FIG. 3 is a timing chart showing the operations of the acousto-optical element and a DMD.

FIG. 3 is a timing chart showing the operations of the Caesar signal generator 11 and the DLP processor 12. In the figure, 4 cycles of the displaying of the RGB channels are repeated for one frame (the number of repeating cycles is not limited to this).

In each cycle, the acousto-optical element 3 generates ultrasonic waves of the frequencies $F_R$, $F_G$, $F_B$ at equal time intervals. Levels of the ultrasonic waves of those frequencies are adjusted by a bright control signal and a color balance control signal asset by the control unit 10. In the illustrated instance, a level indicated by a broken line corresponds to the whole brightness control signal, and a variation of each of the $F_R$, $F_G$, $F_B$ with respect to the broken line level corresponds to the color balance control signal. The DLP processor causes the image display device to display the R-, G- and B-channel images at timings being synchronized with $F_R$, $F_G$, $F_B$ generating timings. A color density is controlled in accordance with an on-time of each pixel (PWM control). The number of gradation levels of each color channel is 256. The density control of the 256 gradation levels may be carried out in each cycle. In an alternative, the color density may be controlled such that the sum of the density controls of all the cycles is equal to 256 gradation levels. In a specific example of such, $120/256$ is expressed in such a manner that the density is controlled to be $64/64$ in the first cycle, $32/64$ in the second cycle, $16/64$ in the third cycle, and $8/64$ in the fourth cycle, The number of repeated cycles of displaying the RGB channel images within one frame is not limited to 4, but may be larger than 4. The image display device is not limited to the DMD, but may be an LCD. The image display device may be not only of the transmission type, but also of the reflection type.

When the RGB rays of light are irradiated onto the image display device by using the acousto-optical element 3, the RGB repeating order is not fixed, but may be changed to an appropriate order upon occasion, for example, an order of R, B and G. A time ratio among R,G, B is not fixed to 1:1:1, but may be changed to an appropriate ratio. The repeating order and time ratio may be changed for each frame or 1 RGB cycle. By using this function, various trick play functions maybe given to the image projection system.

As seen from the foregoing description, color lights corresponding to color images formed by color separating an image into a plurality of color channel images may be supplied by using the acousto-optical element. Accordingly, the invention succeeds in eliminating the drive mechanism and in increasing device silence and durability. Further, the response speed is high and exact. By this feature, the problem of the out-of-color-registration and color flicker is solved.

What is claimed is:

1. An image projection system comprising:

an image display device for display an image to be projected, the image being separated into a plurality of color channels, wherein the image display device sequentially displays the plurality of color channel images in a time division fashion;

a light source for projection;

an acousto-optical element for separating and refracting light emitted from the light source by a diffraction grating formed by using an ultrasonic wave; and an ultrasonic wave generator for selectively generating, for each color, an ultrasonic wave having such a frequency as to cause the acousto-optical element to generate a refraction angle at which each of the spectral rays of color light corresponding to the color channels to be irradiated on the image display device, and supplying the ultrasonic wave to the acousto-optical element, wherein the displaying of each the color channel on the image display device is performed in synchronism with the selecting of the frequency of the ultrasonic wave generated by the ultrasonic wave generating device.

2. The image projection system according to claim 1, wherein the cycles of sequentially and time-divisionally displaying the color channel images within a one-frame period as a time width within which the image to be projected is displayed, are repeated plural times.

3. The image projection system according to claim 1, wherein intensity of light irradiated on the image display device is controlled in accordance with intensity of the ultrasonic wave generated by the ultrasonic wave generating device.

4. An image projection system comprising:

a light source for emitting white light;

an ultrasonic wave generator for generating an ultrasonic wave and controlling a frequency of the ultrasonic wave;

an acousto-optical element for selectively separating specific spectral rays from the white color through the agency of the ultrasonic wave acting on the acousto-optical element;

an image display device for projecting an image formed from the specific spectral rays;

an image display controller for controlling the image display device based on an image data; and a sync signal generator supplying a sync signal to the ultrasonic wave generator and the image display controller for synchronizing the ultrasonic wave generator and the image display controller.

5. The image projection system according to claim 4, wherein the specific spectral rays are rays of at least three colors.

6. The image projection system according to claim 5, wherein the rays including at least three colors are sequentially and repeatedly irradiated from the acousto-optical element onto the image display device.

7. The image projection system according to claim 4, wherein the acousto-optical element controls intensity of each specific spectral rays in accordance with intensity of the ultrasonic wave generator.

* * * * *